(12) United States Patent
Wang et al.

(10) Patent No.: US 7,515,205 B1
(45) Date of Patent: *Apr. 7, 2009

(54) WEIGHTED ABSOLUTE DIFFERENCE BASED DEINTERLACE METHOD AND APPARATUS

(75) Inventors: Zhongde Wang, Camas, WA (US); Dennis Morel, Lake Oswego, OR (US)

(73) Assignee: Pixelworks, Inc., Tualatin, OR (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/565,524

(22) Filed: Nov. 30, 2006

Related U.S. Application Data

(63) Continuation of application No. 10/393,654, filed on Mar. 20, 2003, now Pat. No. 7,154,556.

(60) Provisional application No. 60/366,721, filed on Mar. 21, 2002.

(51) Int. Cl.
*H04N 7/01* (2006.01)
*H04N 11/20* (2006.01)

(52) U.S. Cl. .................................. 348/452; 348/448

(58) Field of Classification Search ............ 348/448, 348/452, 458, 97, 441, 700, 701, 581; 382/299, 382/300
See application file for complete search history.

(56) References Cited

U.S. PATENT DOCUMENTS

| 4,734,770 | A | 3/1988 | Matsuba |
| 4,827,533 | A | 5/1989 | Tanaka |
| 4,937,667 | A | 6/1990 | Choquet et al. |
| 4,967,271 | A | 10/1990 | Campbell et al. |
| 4,982,280 | A | 1/1991 | Lyon et al. |
| 5,019,903 | A | 5/1991 | Dougall et al. |
| 5,070,403 | A | 12/1991 | Wilkinson |
| 5,339,109 | A | 8/1994 | Hong |
| 5,347,559 | A | 9/1994 | Hawkins et al. |
| 5,475,438 | A | 12/1995 | Bretl |
| 5,519,451 | A | 5/1996 | Clatanoff et al. |
| 5,532,751 | A | 7/1996 | Lui |
| 5,592,231 | A | 1/1997 | Clatanoff et al. |
| 5,594,816 | A | 1/1997 | Kaplan et al. |
| 5,786,862 | A | 7/1998 | Kim et al. |
| 5,796,437 | A | 8/1998 | Muraji et al. |
| 5,943,099 | A | 8/1999 | Kim |
| 5,959,693 | A | 9/1999 | Wu et al. |
| 6,055,018 | A | 4/2000 | Swan |
| 6,067,125 | A | 5/2000 | May |
| 6,072,531 | A | 6/2000 | Shibano |

(Continued)

OTHER PUBLICATIONS

T. Doyle; Interlaced to Sequential Conversion for EDTV Applications; 1988; pp. 421-430.

*Primary Examiner*—Victor R Kostak
(74) *Attorney, Agent, or Firm*—Marger Johnson & McCollom, P.C.

(57) ABSTRACT

We describe a weighted absolute difference based deinterlace method and apparatus. The deinterlace method and apparatus uses weighted absolute differences along different directions as means for interpolating pixel data using edge orientation detection. The apparatus includes a memory adapted to store a current and previous fields and predetermined portions of a future field of an input signal. A motion detector is adapted to detect motion between the future and previous fields. An interpolating circuit is adapted to generate a plurality of output pixels using a corresponding plurality of methodologies. And a switch is adapted to select between the plurality of output pixels responsive to the motion detector.

33 Claims, 7 Drawing Sheets

U.S. PATENT DOCUMENTS

| | | | |
|---|---|---|---|
| 6,094,508 A | 7/2000 | Acharya et al. | |
| 6,118,488 A | 9/2000 | Huang | |
| 6,118,489 A * | 9/2000 | Han et al. | 348/452 |
| 6,160,586 A * | 12/2000 | Justiss et al. | 348/452 |
| 6,181,382 B1 | 1/2001 | Kieu et al. | |
| 6,222,589 B1 | 4/2001 | Faroudja et al. | |
| 6,229,578 B1 | 5/2001 | Acharya et al. | |
| 6,512,550 B1 | 1/2003 | de Garrido et al. | |
| 6,731,342 B2 * | 5/2004 | Shin et al. | 348/452 |
| 6,784,942 B2 * | 8/2004 | Selby et al. | 348/452 |
| 6,859,235 B2 | 2/2005 | Walters | |
| 7,095,445 B2 * | 8/2006 | Kim et al. | 348/448 |
| 7,098,957 B2 * | 8/2006 | Kim et al. | 348/452 |
| 7,154,556 B1 * | 12/2006 | Wang et al. | 348/452 |
| 7,405,765 B2 * | 7/2008 | Chao | 348/448 |
| 2002/0075400 A1 | 6/2002 | Shin | |
| 2003/0081144 A1 | 5/2003 | Mohsenian | |

* cited by examiner

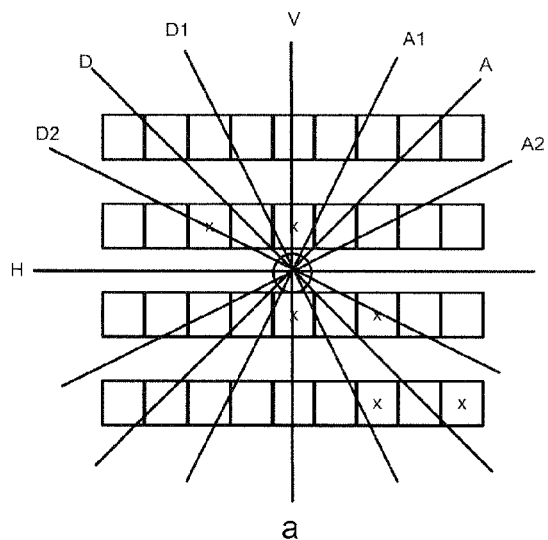
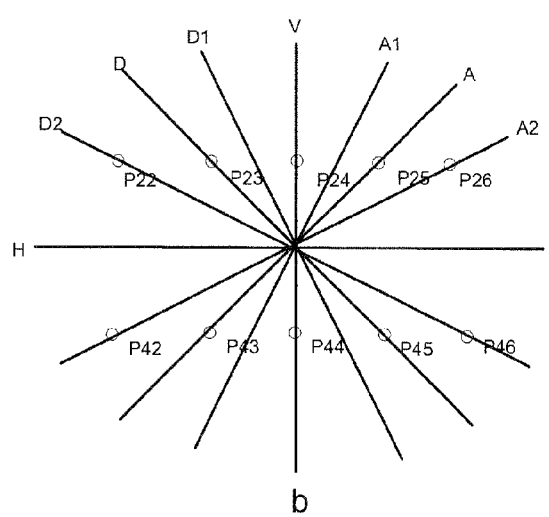
Figure 6A
Figure 6B
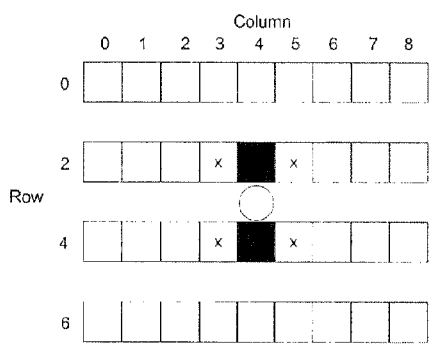
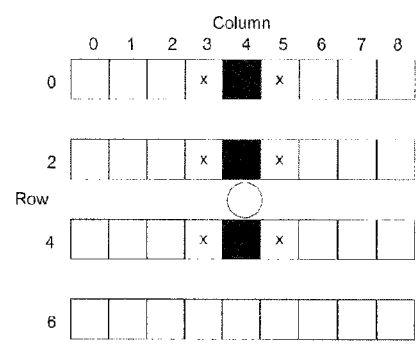
Figure 7A
Figure 7B
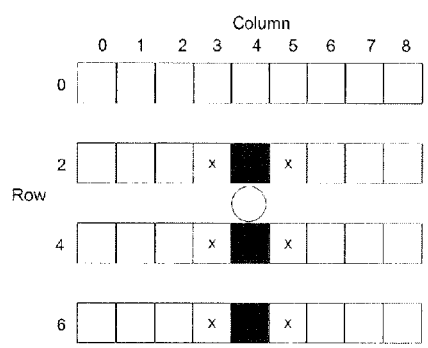
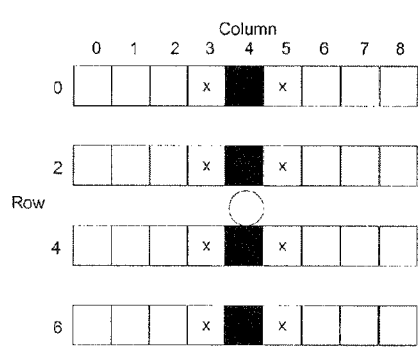
Figure 7C
Figure 7D

WEIGHTED ABSOLUTE DIFFERENCE BASED DEINTERLACE METHOD AND APPARATUS

This application is a continuation and claims priority from U.S. patent application Ser. No. 10/393,654 filed Mar. 20, 2003, which claims priority from U.S. provisional patent application Ser. No. 60/366,721, filed Mar. 21, 2002. We incorporate all priority applications by reference.

BACKGROUND OF THE INVENTION

1. Field of the Invention

The invention relates to a weighted absolute difference based deinterlace method and apparatus.

2. Description of the Related Art

The National Television Standards Committee (NTSC) is responsible for setting television video standards in the United States. The NTSC standard is interlaced. Each frame (480 viewable lines) is broken into two sections called fields (240 alternating viewable lines). A field containing even lines (0, 2, 4, . . . ) is termed an even field. Similarly, a field containing odd lines (1, 3, 5, . . . ) is termed an odd field.

Every 1/60 second, the NTSC standard requires displaying an even or an odd field. Because this process is happening quickly, the eye is tricked into seeing a full frame picture. The image quality resulting from the NTSC standard is acceptable on smaller television sets—those having roughly 27 inches viewable area. The image quality, however, quickly degrades as the screen size increases. This is because the NTSC standard creates artifacts, e.g., flickering, shimmering, and diagonal line jaggedness, visible to the eye on large screens. This image quality degradation renders the NTSC standard also unacceptable for high definition television (HDTV). And NTSC is incompatible with most personal computer and liquid crystal (LC) displays that operate on progressive scan. Progressive scan presents a higher quality alternative to the interlaced NTSC standard. Progressive scan require displaying alternating odd and even lines with each frame.

Accordingly, a need remains for an improved method and apparatus that converts interlaced to progressive scan signals.

BRIEF DESCRIPTION OF THE DRAWINGS

The foregoing and other objects, features, and advantages of the invention will become more readily apparent from the detailed description of embodiments that reference the following drawings.

FIG. 6A is a diagram of interpolation directions relative to pixels in the current field.

FIG. 6B is a diagram of interpolation directions relative to the pixel to be interpolated.

FIGS. 7A-D are diagrams of a vertical line in the current field.

DETAILED DESCRIPTION OF THE EMBODIMENT(S)

Converting interlaced video signals into progressively scanned video signals requires converting interlaced scanned fields, each comprising odd or even scan lines of a video signal frame, into progressively scanned fields, each comprising both odd and even scan lines.

The invention relates to a deinterlace method and apparatus adapted to interpolate pixel data for a missing line in an interlaced video signal. More particularly, the invention relates to a deinterlace method and apparatus using weighted absolute differences along different directions as means for interpolating pixel data using edge orientation detection.

Figure 1:
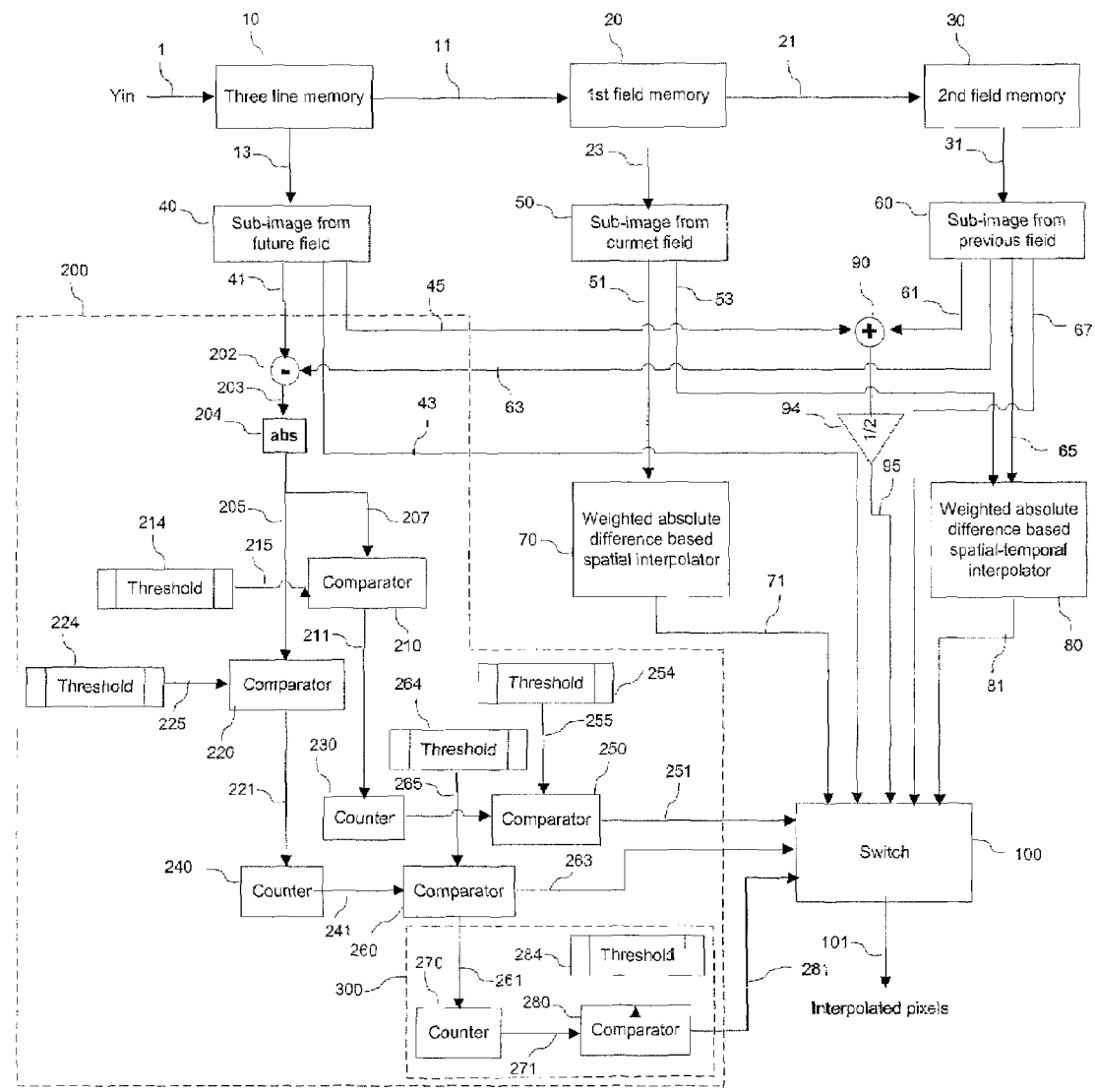
FIG. 1 is a block diagram of a deinterlace apparatus and method embodiment.

FIG. 1 is a block diagram of a deinterlace apparatus. Referring to FIG. 1, the deinterlace apparatus comprises a line memory 10 adapted to store a predetermined number of lines of an input luminance signal Yin's future field. Each line of the future field includes a multitude of pixels. The future field has a first polarity, e.g., even.

The input luminance signal Yin passes to a first or current field memory 20 through 11. The current field memory 20 stores a current field of the input luminance signal Yin. The current field has a second polarity, e.g., odd.

The input luminance signal Yin passes to a second or previous field memory 30 through 21. The previous field memory 30 stores a previous field of the input luminance signal Yin. The previous field has a first polarity, e.g., even, same as the future field stored in the line memory 10.

The line memory 10 and the field memories 20 and 30 might be synchronous dynamic random access memory (SDRAM) or other types of memory. A person of reasonable skill in the art should recognize that the line memory 10 and the field memories 20 and 30 might be implemented in a singular memory, in distinct or separate memory, or any combination thereof.

Figure 2A:
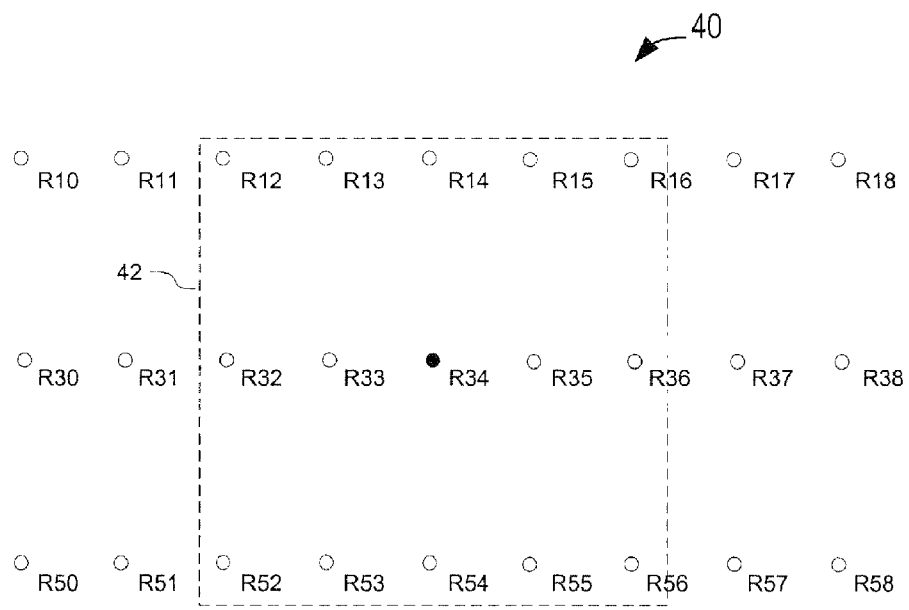
FIGS. 2A and 2B is a diagram of a sub-image in previous and future fields, respectively.

Referring to FIG. 2A, the line memory 10 includes a future field sub image 40 having a predetermined size, e.g., 3×5. The future field sub image 40 is extracted from the line memory 10 through line 13. The future field sub image 40 is centered at pixel R34, located in the same position as the pixel to be interpolated (x in FIG. 3) in the current field. For convenience only, FIG. 2A shows a larger 3×9 future field sub image 40.

Figure 2B:
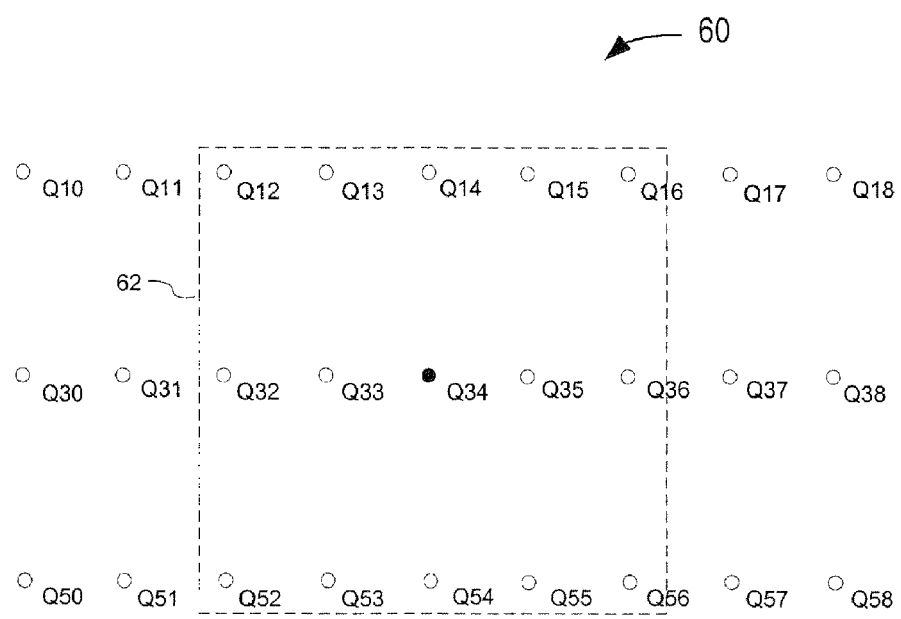

Referring to FIG. 2B, the field memory 30 includes a similar previous field sub image 60 having a predetermined size, e.g., 3×5. The previous field sub image 60 is extracted from the field memory 30 through line 31. The previous field sub image 60 is centered at pixel Q34, located in the same position as pixel R34 in the future sub image 40. Again for convenience only, FIG. 2B shows a larger 3×9 previous field sub image 60.

Figure 3:
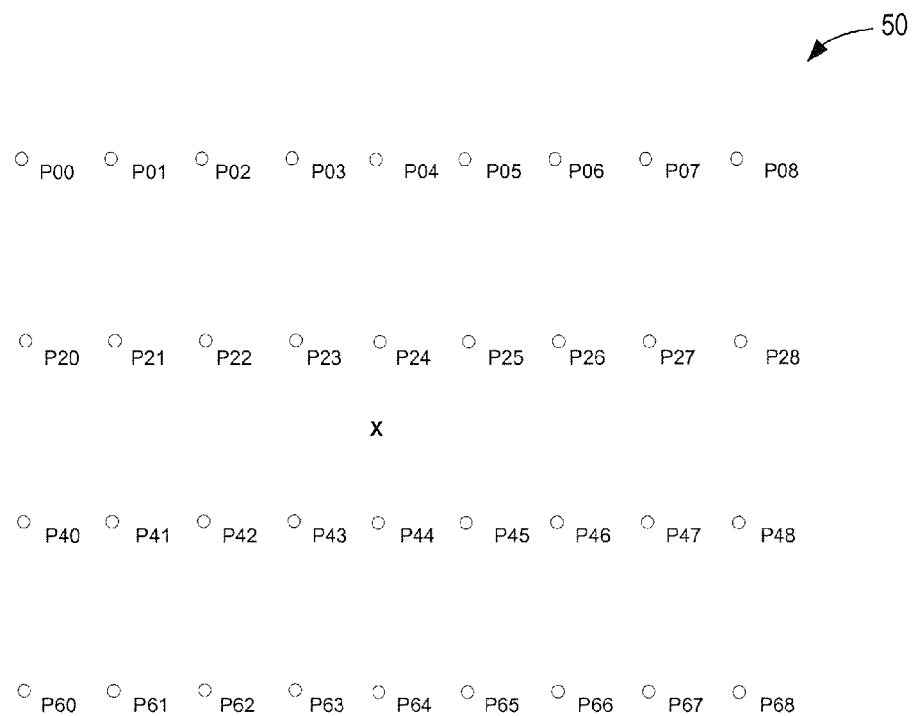
FIG. 3 is a diagram of a sub-image in a current field.

Referring to FIG. 3, the field memory 20 includes a current field sub image 50 having a predetermined size, e.g., 4×9. The current field sub image 50 is extracted from the field memory 20 through line 23. The current field sub image 50 is centered at an interpolated pixel represented by x. The sub image 50 includes, for example, even lines 0, 2, 4, and 6. Since the current field has a different polarity than the future or previous fields, the lines in the future or previous sub images 40 and 60, respectively, are odd lines 1, 3, and 5.

A person of reasonable skill in the art should recognize that any size of sub image comes within the scope of the present invention.

Referring to FIGS. 1, 2A, 2B, and 3, the pixel to be interpolated, denoted by x, is at the center of the sub images 40, 50, and 60. The pixel x is located on a missing line of the current field 50. When the pixel x is on a line that is close to a boundary of the video image, some pixels in any sub image might fall outside the video image. For example, suppose the current field 50 is an odd field that contains pixels of odd lines 1, 3, 5, . . . . And suppose that the pixel x is the top left corner of the video image, e.g., P00. This locates the center of the sub images at the top left corner of the video image. All of the pixels above and the left of P00 will be outside the video image. In this circumstance, the deinterlace method and apparatus sets the value of all pixels outside the video image to a predetermined value, e.g., zero.

The motion detector 200 detects motion between the future and previous field sub images 40 and 60. The motion detector 200 includes a subtractor 202 and an absolute operator 204. The subtractor 202 subtracts the luminance or value of a pixel in the future field sub image 42, e.g., pixel R34, from the luminance or value of a pixel in the previous field sub image 62, e.g., pixel Q34, where the pixels are located in the same position in the two different fields. That is, the subtractor 202 subtracts the future field sub image 42 from the previous field sub image 62 on a pixel-by-pixel basis through lines 41 and 63. The operator 204 takes the absolute of the difference produced by the subtractor 202 through line 203. The operator 204 provides the absolute difference to first and second comparators 210 and 220 through lines 207 and 205, respectively. The first comparator 210 compares the absolute difference at 207 to a first predetermined threshold 214. Likewise, the second comparator 220 compares the absolute difference at 205 to a second predetermined threshold 224. The first threshold 214 is typically set higher than the second threshold 224.

The first comparator 210 provides its results to a first counter 230 through line 211. The first counter 230 counts the number of cases where |Rij−Qij|>T214 in the sub image 42, where T214 is the first threshold 214. The first counter 230 provides its results to a third comparator 250. The third comparator asserts a motion signal at 251—indicating motion between future and previous sub images 40 and 60, respectively—when the results of the first counter 230 exceed a third threshold 254.

The second comparator 220 provides its results to a second counter 240 through line 221. The second counter 240 counts the number of cases where |Rij−Qij|<T224 in the sub image 42, 1224 is the second threshold 224. The second counter 240 provides its results to a fourth comparator 260 through line 241. The fourth comparator 260 asserts a no motion signal at 263—indicating that the future and previous sub images 40 and 60, respectively, are part of a still (or non moving) portion of the video image—when the results of the second counter 240 exceed a fourth threshold 264.

The motion detector 200 includes a film mode detector 300 adapted to detect a film mode in the input luminance signal Yin. The film mode detector 300 comprises a film mode counter 270, comparator 280, and threshold 284. The film mode counter 270 counts the number of cases where the pixel to be interpolated x does not belong to a moving part of the image in a predetermined portion of the video image. The predetermined portion of the video image might be the whole field, the most active part of the video, an upper portion of the video, and the like. A person of reasonable skill in the art should understand that other criteria for selecting predetermined portions of the video image come within the scope of the present invention.

The film mode comparator 280 receives the counter 270's count at 271. The comparator 280 compares the count at 271 with the film mode threshold 284. The comparator 280 asserts a film mode signal at 281 if the count is less than the threshold 284. That is, the previous and the future fields come from the same frame indicating that the video was converted from film using the well known 3:2 pull down conversion method.

The first, second, third, fourth, and film mode thresholds 214, 224, 254, 264, 284, respectively, might be set through firmware, hardware, software, or a combination thereof.

The switch 100 selects output pixels at 71, 95, 81, 43, or 67 responsive to the motion signal at 251, the no motion signal at 263, and the film mode signal at 281. The switch 100 selects the spatially interpolated pixels at 71 responsive to the motion signal at 251. In this case, the correlation of the current field to the previous or future field is low. The effect of the previous or future field is, therefore, minimized. A purely spatial directional deinterlacing from the weighted absolute difference based spatial interpolator 70 is applied to interpolate the pixel of interest through 71.

The switch 100 selects the averaged signals at 95 responsive to the no motion signal at 263. The pixels at 95 are the average of R34 and Q34. Pixels from the future and previous sub image fields 42 and 62, respectively, are provided through line 45 and 61 to an adder 90. The results of adder 90 are provided to a shift circuit 94 that outputs the average to line 95. Put differently, a static mesh is applied to interpolate the pixel of interest x to increase the vertical resolution. Taking the average pixel value from the previous and future field sub images 40 and 60 allows about a 3 dB improvement in noise elimination.

The switch 100 selects spatial-temporally interpolated pixels at 81 responsive to the unasserted (or false) motion and no motion signals at 251 and 263, respectively. That is, if both the motion and no motion signals at 251 and 263 are false, the confidence that the pixel x to be interpolated belongs to either a moving or a still portion of the image is not high enough. The deinterlace apparatus, therefore, adopts a hybrid interpolation approach selecting spatial-temporally interpolated pixels at 81.

The switch 100 selects pixels at either 43 or 67 responsive to the film mode signal at 281, as we explain below. An asserted (or true) film mode signal at 281 will block the motion and no motion signals at 251 and 263, respectively, and thus, prevent the switch 100 from selecting the temporally interpolated, averaged, and spatial-temporally interpolated pixels at 71, 95, and 81, respectively. And an asserted film mode signal at 281 will disable the film mode detector 300 for four fields. For the next four fields, the deinterlace apparatus of FIG. 1 enters a film mode. During the film mode, the switch 100 selects either pixel R34 or pixel Q34 as the output pixel, depending on the inverse 3:2 pull down requirement. That is, the deinterlace apparatus will merge the current field with either the previous or future fields (since the previous and future fields are theoretically identical).

Figure 4:
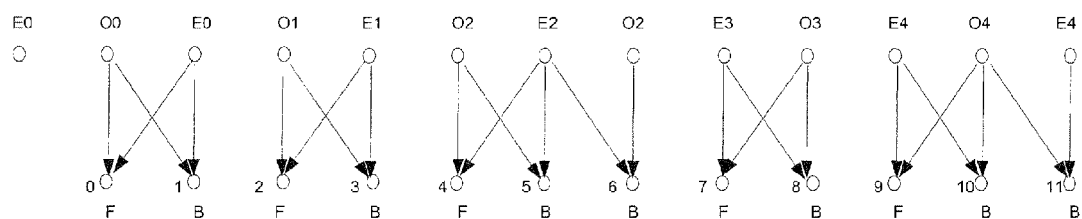
FIG. 4 is a field merge pattern.

FIG. 4 is a field merge pattern. Referring to FIG. 4, the upper circles represent the input fields. The letter above them represents the polarity and the frame number from the film source. For example, field E0 if from frame 0 of the film source and its polarity is even.

The lower circles represent the output frames. The number beside each circle represents the output frame count. The letters B or F below each lower circle represent the merge pattern. The letter B represents a backward merge that merges the current field with the previous field. The letter F represents a forward merge that mergers the current field with the future field. The two arrows toward each output frame represent that the frame comes from those two fields indicated by the two arrows. The input field pattern shown in FIG. 4 complies with a typical 3:2 pull down format. The video generates three fields from frame 0 of the source film then two fields from frame 1, then three fields from frame 2, then two fields from frame 3, and so on.

At the position of the output frame 0, the current, previous, and future fields are from frame 0 of the source film. The previous and future fields are theoretically identical. In practice, however, noise prevents the previous and future fields from being identical. The deinterlace apparatus detects identical fields by scanning only a portion (a sub image) of the field. In other words, in the deinterlace apparatus, it is unnecessary to scan the field in its entirety to determine whether the video originated from film. When the deinterlace apparatus detects identical fields, it immediately enters film mode. Before the apparatus completes its film mode detection, therefore, it calculates the missing lines of frame 0. Once in film mode, the apparatus fills the remaining missing lines of frame 0 by merging the corresponding lines in the future field. The result is a partially merged frame 0 that we represent in FIG. 4 with a dotted line.

The film mode detector 300 is disabled for the next four fields, corresponding to output frames 1, 2, 3, and 4. The deinterlace apparatus merges the current field with the previous field for output frames 1 and 3 and merges the current field with the future field for output frames 2 and 4. At the fifth field, which corresponds to output frame 5, the film mode detector is enabled, and the film mode signal remains asserted (true) until the count at 271 provided by counter 270 exceeds the threshold 284 again. If the count at 271 does not exceed the film mode threshold 284 for a predetermined region, the film mode detector 300 again detects identical future and previous fields, and the deinterlace apparatus again enters film mode for the next four fields. If the film mode detector 200 does not detect identical future and previous fields, the count at 271 soon—within just a few scan lines—exceeds the film mode threshold 284 and deasserts (false) the film mode signal at 281. The deasserted film mode signal at 281 immediately switches the deinterlace apparatus to video mode allowing the switch 100 to select spatially interpolated, averaged, and temporal-spatially interpolated pixels at 71, 95, and 81, respectively, responsive to the motion and no motions signals at 251 and 263, respectively. The video mode will prevent the switch 100 from merging output pixels from the future or previous fields at 43 and 67, respectively.

Figure 5:
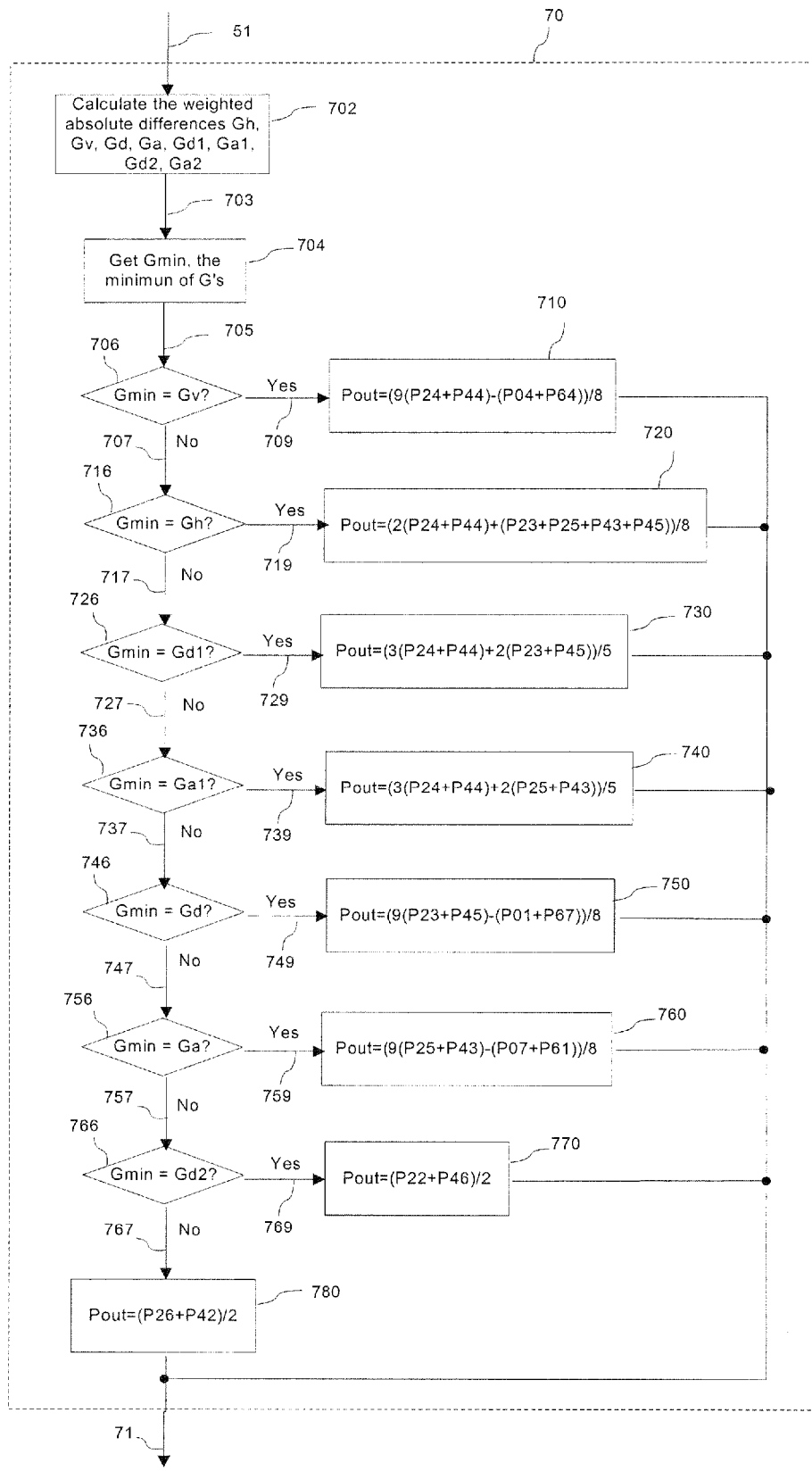
FIG. 5 is a flowchart of a spatial interpolation embodiment.

FIG. 5 is a flowchart of an implementation of the spatial interpolator 70 shown in FIG. 1. Referring to FIGS. 1 and 5, the spatial interpolator 70 calculates a gradient for a plurality of directions from the current field sub image 50 provided at line 51. The plurality of directions might include the vertical (V, 90°), horizontal (H, 180°), diagonal (D, −45°), anti-diagonal (A, 45°), diagonal-1 (D1, −63°), anti-diagonal-1 (A1, 63°), diagonal-2 (D2, −27°), and anti-diagonal-2 (A2, 27°) directions. A person of reasonable skill in the art should understand directions other than those mentioned come within the scope of the invention.

FIG. 6A shows the eight directions we list above relative to the pixels in the current field, the pixels being represented by squares. FIG. 6B shows the eight directions relative to the pixel to be interpolated x, with the rows immediately above and below. The pixel to be interpolated x is at the crossing point of the eight directions. Referring to FIG. 6B, except for the horizontal H, diagonal-1 D1, antidiagonal-1 A1 directions, each line on any direction passes the center of one pixel on the row above and one pixel on the row below the pixel to be interpolated x. Lines D1 and A1 cross midway between two pixels on the row above and two pixels on the row below the pixel to be interpolated x. The horizontal line H does not pass any pixels in the current field as we expect.

Referring back to FIGS. 1 and 5, the gradient estimations for the eight directions are represented by $G_v$, $G_h$, $G_d$, $G_a$, $G_{d1}$, $G_{a1}$, $G_{d2}$ and $G_{a2}$. The spatial interpolator 70 calculates the eight gradients $G_v$, $G_h$, $G_d$, $G_a$, $G_{d1}$, $G_{a1}$, $G_{d2}$ and $G_{a2}$ at 702. We describe an embodiment of these calculations below. The spatial interpolator 70 determines the minimum gradient $G_{min}$ at 704. The spatial interpolator 70 then compares each of the eight gradients $G_v$, $G_h$, $G_d$, $G_a$, $G_{d1}$, $G_{a1}$, $G_{d2}$ and $G_{a2}$ against the minimum gradient $G_{min}$.

For example, at 706, the spatial interpolator 70 determines whether the minimum gradient $G_{min}$ is equal to the vertical gradient $G_v$. If it is, it calculates the output pixel Pout at 710.

If it is not, the spatial interpolator 70 determines whether the minimum gradient $G_{min}$ is equal to the horizontal gradient $G_h$ at 716. If it is, it calculates the output pixel Pout at 720.

If it is not, the spatial interpolator 70 determines whether the minimum gradient $G_{min}$ is equal to the diagonal-1 gradient $G_{d1}$ at 726. If it is, it calculates the output pixel Pout at 730.

If it is not, the spatial interpolator 70 determines whether the minimum gradient $G_{min}$ is equal to the anti-diagonal-1 gradient $G_{a1}$ at 736. If it is, it calculates the output pixel Pout at 740.

If it is not, the spatial interpolator 70 determines whether the minimum gradient $G_{min}$ is equal to the diagonal gradient $G_d$ at 746. If it is, it calculates the output pixel Pout at 750.

If it is not, the spatial interpolator 70 determines whether the minimum gradient $G_{min}$ is equal to the anti-diagonal gradient $G_a$ at 756. If it is, it calculates the output pixel Pout at 760.

If it is not, the spatial interpolator 70 determines whether the minimum gradient $G_{min}$ is equal to the diagonal-2 gradient $G_{d2}$ at 766. If it is, it calculates the output pixel Pout at 770.

If it is not, the spatial interpolator 70 determines the minimum gradient $G_{min}$ is equal to the anti-diagonal-2 gradient $G_{a2}$ and calculates the output pixel Pout at 780.

FIGS. 7A-D are diagrams of a vertical line in the current field. The circle at the center of the diagram represents the pixel to be interpolated x (FIG. 3). The line shown in FIG. 7A might not be classified as a line even after interpolation because of its short length (3 pixels). The vertical lines shown in FIGS. 7B and 7C are likely the ends of vertical lines, but they might also represent lines with short lengths (3 pixels) in the current field only, or five or six pixels after interpolation. Put differently, the vertical lines shown in FIGS. 7B and 7C might represent very short lines. FIG. 7D presents a fourth case showing a high confidence vertical line, with a longer length of at least 7 pixels after interpolation.

Figures 8A, 8B, 8C, 8D, 9:
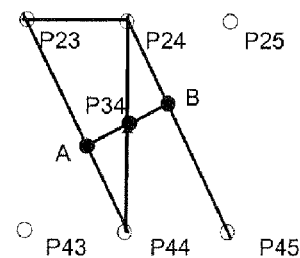
FIGS. 8A-D are diagrams of a diagonal line in the current field.
FIG. 9 is a diagram of an interpolation method embodiment used to obtain a pixel along the diagonal direction.

FIGS. 8A-D are diagrams of a diagonal line in the current field. Similarly to the vertical lines shown in FIGS. 7A-D, the diagonal line of FIG. 8A might be too short to classify as a diagonal line. The diagonal lines shown in FIGS. 8B and 8C are likely the ends of diagonal lines. FIGS. 6A-B and FIGS. 7A-D show that the deinterlace apparatus needs about a two pixel line length in the current field to determine whether there is a line or edge passing through the pixel to be interpolated x (FIG. 3).

When a line or edge passes through the pixel to be interpolated x (FIG. 3), the immediately adjacent neighbor on either side of the line or edge will have almost identical properties to the line or edge. The gradient in the direction of the line or edge, therefore, will likely be the smallest. The pixels marked with an x in FIGS. 6A and 7A-D are the pixels adjacent to lines. To measure the gradient of the pixel in a particular direction, a weighted sum of the absolute differences of a surrounding neighborhood on a given direction is taken into account.

The gradient is the derivative of a function on a given direction. In the digital domain, the derivative is replaced by a difference. The gradient is thus measured by differentiation of variously spaced pixels. For example, referring to FIG. 3, assume the absolute difference of a single pair of pixels measures the gradient. And assume that |P24–P44|=|P23–P45|. Under these assumptions, we would not conclude that the gradient along the vertical direction is the same as the gradient along the diagonal direction. The gradient along the vertical direction is approximately P24–P44 divided by the distance between P24 and P44. Likewise, the gradient along the diagonal direction is approximately P23–P45 divided by the distance between P23 and P45. Since the distance between P23 and P45 is 1.41 times the distance between P24 and P44, the gradient along the vertical direction is 0.41 times greater than the gradient along the diagonal direction.

In one embodiment, the gradient is measured for the eight directions shown in FIG. 6. A person of skill in the art should recognize that other directions come within the scope of the present invention.

The gradient calculations for the eight directions are as follows.

Horizontal (H) Direction $$G_h = w_h[a_0(|P23-P24|+|P24-P25|+|P43-P44|+|P44-P45|)+a_1(|P22-P23|+|P25-P26|+|P42-P43|+|P45-P46|)]$$

Vertical (V) Direction $$G_v = w_v[b_0|P24-P44|+b_1(|P23-P43|+|P25-P45|)+b_2(|P04-P24|+|P44-P46|)+b_3(|P03-P23|+|P43-P63|+|P05-P25|+|P45-P65|)]$$

Diagonal (D) Direction $$G_d = w_d[c_0|P23-P45|+c_1(|P22-P44|+|P24-P46|)+c_2(|P01-P23|+|P45-P67|+|P02-P24|+|P44-P66|)]$$

Anti-Diagonal (A) Direction $$G_a = w_a[c_0|P25-P43|+c_1(|P24-P42|+|P26-P44|)+c_2(|P07-P25|+|P43-P61|+|P06-P24|+|P44-P62|)]$$

Diagonal-1 (D1) Direction $$G_{d1} = w_{d1}[d_0(|P23-P44|+|P24-P45|)+d_1(|P22-P43|+|P25-P46|)+d_2(|P03-P24|+|P44-P65|)+d_3(|P02-P23|+|P45-P66|)]$$

Anti-Diagonal-1 (A1) Direction $$G_{a1} = w_{a1}[d_0(|P25-P44|+|P24-P43|)+d_1(|P23-P42|+|P26-P45|)+d_2(|P05-P24|+|P44-P63|)+d_3(|P06-P25|+|P43-P62|)]$$

Diagonal-2 (D2) Direction $$G_{d2} = w_{d2}[e_0|P22-P46|+e_1(|P21-P45|+|P23|P47|)+e_2(|P00-P24|+|P24-P48|+|P20-P44|+|P44-P68|)]$$

Anti-Diagonal-2 (A2) Direction $$G_{a2} = w_{a2}[e_0|P26-P42|+e_1(|P25-P41|+|P27|P43|)+e_2(|P08-P24|+|P24-P40|+|P28-P44|+|P44-P60|)]$$

In the gradient calculations, w's, $a_0$, $b_0$, $c_0$, $d_0$, and $e_0$ are predetermined weights. The gradient for a plurality of directions, e.g., eight directions, will be calculated for the pixel to be interpolated x. The minimum gradient will give the interpolation direction.

We implement one embodiment of the spatial interpolator 70 as follows. We implement interpolation in the vertical, diagonal, and anti-diagonal directions using a four-tap low pass half-band filter. We implement interpolation in the diagonal-2 and anti-diagonal-2 directions using a two-tap low pass half-band filter. Horizontal interpolation is impossible since the horizontal line is entirely missing. Thus, we obtain the horizontal line by applying a low pass filter to the rows above and below and then averaging.

FIG. 5 lists the formulas we use to calculate the output pixels depending on the minimum gradient direction. For example, if the minimum gradient $G_{min}$ is equal to the vertical gradient $G_v$ at 706, we calculate the output pixel Pout with the formula given at 710. If the minimum gradient $G_{min}$ is equal to the horizontal gradient $G_h$ at 716, we calculate the output Pout with the formula given at 720. If the minimum gradient $G_{min}$ is equal to the diagonal-1 gradient $G_{d1}$ at 726, we calculate the output Pout with the formula given at 730. If the minimum gradient $G_{min}$ is equal to the anti-diagonal-1 gradient $G_{a1}$ at 736, we calculate the output Pout with the formula given at 740. If the minimum gradient $G_{min}$ is equal to the diagonal gradient $G_d$ at 746, we calculate the output Pout with the formula given at 750. If the minimum gradient $G_{min}$ is equal to the diagonal gradient $G_a$ at 756, we calculate the output Pout with the formula given at 760. If the minimum gradient $G_{min}$ is equal to the diagonal-2 gradient $G_{d2}$ at 766, we calculate the output Pout with the formula given at 770. If the minimum gradient $G_{min}$ is equal to the anti-diagonal-2 gradient $G_{s2}$, we calculate the output Pout with the formula given at 780.

FIG. 9 is a diagram of the interpolation method used in an embodiment of the present invention to obtain an output pixel along the diagonal D1 direction. In FIG. 9, the pixel to be interpolated x (FIG. 3) is shown as output pixel P34. Two intermediate pixels A and B are generated by linear interpolation along the D1 direction. Then, output pixel P34 is obtained by averaging the value of pixels A and B. Since line AB is perpendicular to direction D1, interpolation occurs on an orthogonal base.

From simple geometry, the ratio of the lengths $\overline{P23A}$ and $\overline{AP44}$ is 3:2. That yields the formulas given in 730 and 740. An embodiment of the present invention, therefore, provides a mean of interpolation along D1 direction without requiring super-sampling. The interpolation method of the present invention is also more accurate than methods requiring super-sampling.

Figure 10:
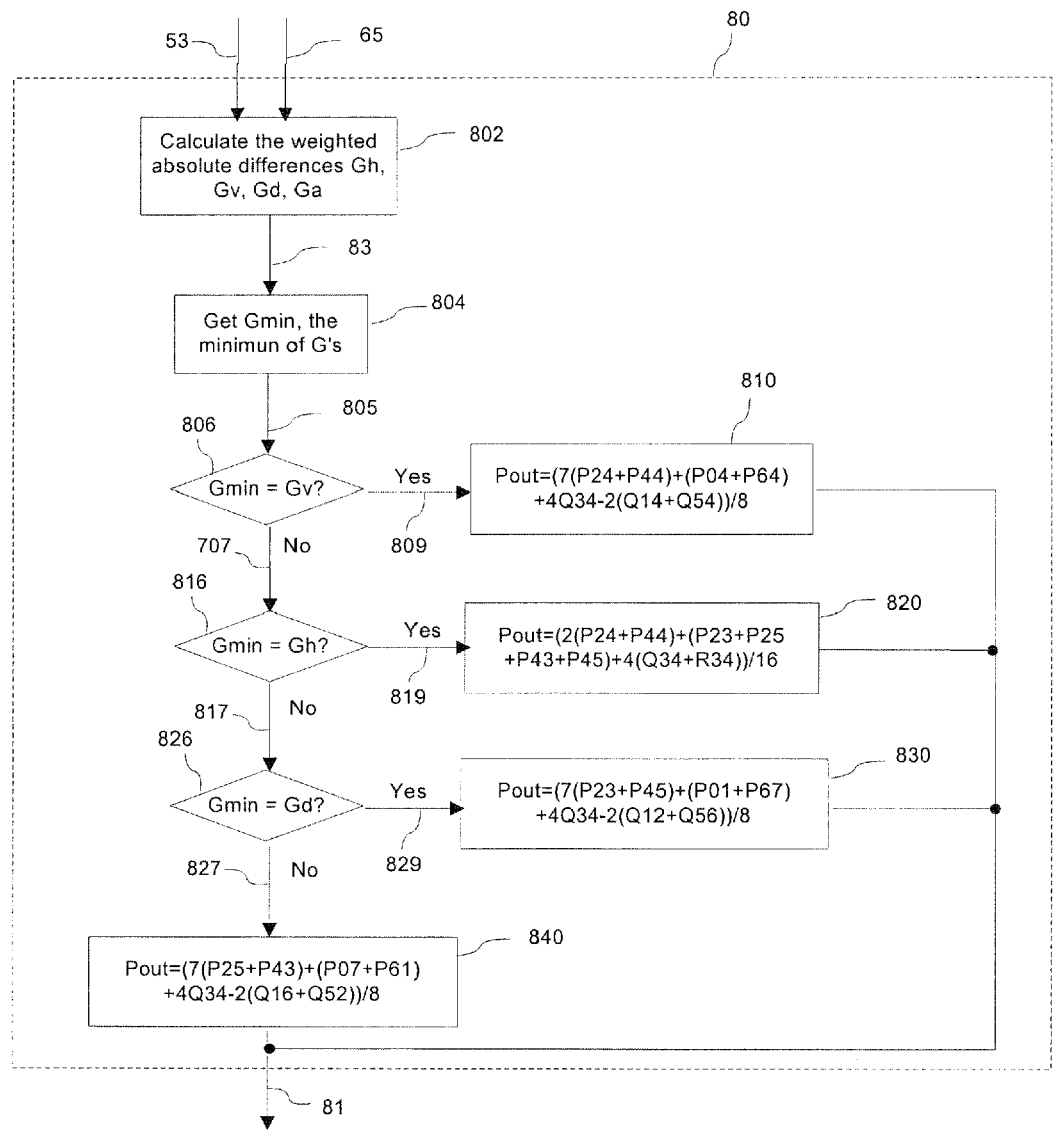
FIG. 10 is a flowchart of a spatial-temporal interpolation embodiment.

FIG. 10 is a flowchart of an implementation of the spatial-temporal interpolator 80 shown in FIG. 1. Referring to FIGS. 1 and 5, the switch 100 selects output pixels generated by the spatial-temporal interpolator 80 when there exists uncertainty in the status of the pixel to be interpolated x (FIG. 3). That is, it is unclear whether the pixel to be interpolated x is part of a moving or still portion of the video image. Even if the pixel to be interpolated x belongs to a moving part of the video image, that motion is not strong. The current, previous, and/or future fields are therefore taken into account to interpolate the output pixel x.

In one embodiment of the spatial-temporal interpolator 80, we use four directions, e.g., vertical, horizontal, diagonal, and anti-diagonal to interpolate the pixel x. A person of reasonable skill in the art should understand directions other than those mentioned can be used instead of or in conjunction with those we mention above, and that all combinations thereof come within the scope of the invention.

Referring to FIGS. 1 and 10, the spatial-temporal interpolator 80 calculates a gradient for a plurality of directions from the current field sub image 50 provided at line 53 and the previous field sub image 62 provided at line 65 (802). In one embodiment, the spatial-temporal interpolator 80 calculates the gradients in the four directions, e.g., vertical (V), horizontal (H), diagonal (D), and anti-diagonal (A). It is worth noting that the gradient calculations are the same as those for the spatial interpolator 70. The gradient calculations, therefore, need only be performed once to be used by both the spatial interpolator 70 and the spatial-temporal interpolator 80.

The spatial-temporal interpolator 80 determines the minimum gradient $G_{min}$ at 804. The spatial-temporal interpolator 80 then compares each of the four gradients $G_v$, $G_h$, $G_d$, and $G_a$, against the minimum gradient $G_{min}$.

For example, at 806, the spatial-temporal interpolator 80 determines whether the minimum gradient $G_{min}$ is equal to the vertical gradient $G_v$. If it is, it calculates the output pixel Pout at 810.

If it is not, the spatial-temporal interpolator 80 determines whether the minimum gradient $G_{min}$ is equal to the horizontal gradient $G_h$ at 816. If it is, it calculates the output pixel Pout at 820.

If it is not, the spatial-temporal interpolator 80 determines whether the minimum gradient $G_{min}$ is equal to the diagonal gradient $G_d$ at 826. If it is, it calculates the output pixel Pout at 830.

If it is not, the spatial-temporal interpolator 80 determines the minimum gradient $G_{min}$ is equal to the anti-diagonal gradient $G_a$ and calculates the output pixel Pout at 840.

We implement one embodiment of the spatial-temporal interpolator 80 as follows. We implement interpolation in the vertical, diagonal, and anti-diagonal directions using a seven-tap spatial-temporal filter. We obtain the horizontal line by averaging the still and moving image portions.

It should be readily apparent that the deinterlace method and apparatus might be implemented using hardware, software, firmware, or a combination thereof. The deinterlace method and apparatus might include a microprocessor or a microcontroller. And the deinterlace apparatus and method might be specially constructed for the required purposes or it might comprise a general-purpose computer selectively activated or reconfigured by a computer program stored in the computer.

We have described and illustrated the principles of our invention. Those of skill in the art should recognize that the invention might be modified in arrangement and detail without departing from these principles. We claim all modifications coming within the spirit and scope of the accompanying claims.

We claim:

1. An apparatus, comprising:
   a motion detector to detect motion between a previous field and a future field;
   a spatial interpolator to generate a first group of pixels by spatially interpolating a current field;
   a spatial-temporal interpolator to generate a second group of pixels by temporal-spatially interpolating the previous field with the current field;
   an averaging circuit to generate a third group of pixels by averaging the future and previous fields; and
   a switch to select between the first, second, and third groups of pixels responsive to the motion detector.

2. The apparatus of claim 1 where the motion detector is configured to detect motion between sub images of the previous and future fields.

3. The apparatus of claim 2 where the spatial interpolator is configured to generate the first group of pixels by spatially interpolating a sub image of the current field.

4. The apparatus of claim 3 where the spatial-temporal interpolator is configured to generate the second group of pixels by temporal-spatially interpolating the sub image of the previous field with the sub image of the current field.

5. The apparatus of claim 4 where the averaging circuit is configured to generate the third group of pixels by averaging the sub images of the future and previous fields.

6. The apparatus of claim 1 where the motion detector comprises a film mode detector to detect a film mode.

7. The apparatus of claim 6 where the film mode detector comprises:
   a counter to generate a count signal; and
   a comparator to generate a film mode signal by comparing the count signal to a predetermined threshold.

8. The apparatus of claim 7 where the film mode signal is configured to indicate the previous and future fields are from a same frame.

9. The apparatus of claim 8 where the switch is configured to select a fourth group of pixels responsive to the film mode signal.

10. The apparatus of claim 9 where the switch is configured to select the fourth group of pixels by merging the current field with the previous field.

11. The apparatus of claim 10 where the switch is configured to select the fourth group of pixels by merging the current field with the future field.

12. An apparatus, comprising:
    a motion detector to generate motion, no motion, and film mode signals by analyzing pixels in sub images of current, future, and previous fields;
    a spatial interpolator to generate spatially interpolated pixels by spatially interpolating the current field;
    a spatial-temporal interpolator to generate temporal-spatially interpolated pixels by temporal-spatially interpolating the previous field with the current field; and
    an averaging circuit to generate averaged pixels by averaging the future and previous fields.

13. The apparatus of claim 12 comprising:
    a switch to select between the spatially interpolated, temporal-spatially interpolated, and averaged pixels responsive to the motion, no motion, and film mode signals.

14. The apparatus of claim 13 where the motion detector comprises a film mode detector to detect a film mode.

15. The apparatus of claim 14 where the film mode detector comprises:
    a counter to generate a count signal; and
    a comparator to generate the film mode signal by comparing the count signal to a predetermined threshold.

16. The apparatus of claim 15 where the film mode signal is configured to indicate the previous and future fields are from a same frame.

17. The apparatus of claim 16 where the switch is configured to select pixels in the previous and future fields without interpolating and averaging the pixels when the film mode detector generates the film mode signal.

18. The apparatus of claim 12 where the motion detector comprises:
    a subtracting circuit to generate a difference of pixels in the future field from corresponding pixels in the previous field;
    a first comparator to generate a first compare signal by comparing the difference to a first threshold; and
    a second comparator to generate a second compare signal by comparing the difference to a second threshold.

19. The apparatus of claim 18 where the difference is an absolute difference.

20. The apparatus of claim 18 where the motion detector comprises:
  a first counter to generate a first counter signal by counting first compare signals; and
  a second counter to generate a second counter signal by counting second compare signals;
  a third comparator to generate the motion signal by comparing the first counter signal to a third threshold; and
  a fourth comparator to generate the no motion signal by comparing the second counter signal to a fourth threshold.

21. A method, comprising:
  generating motion, no motion, and film mode signals by analyzing pixels in sub images of current, future, and previous fields;
  spatially interpolating pixels in the sub image of the current field;
  spatial-temporally interpolating the pixels in the sub image of the current field with pixels in the sub image of the previous field; and
  averaging pixels in the sub images of the future and previous fields.

22. The method of claim 21 comprising:
  selecting between the spatially interpolated, temporal-spatially interpolated, and averaged pixels responsive to the motion, no motion, and film mode signals.

23. The method of claim 22 where generating the film mode signal comprises:
  generating a count signal when a pixel in the sub image of the future field and a corresponding pixel in the sub image of the previous field are from a same frame; and
  generating the film mode signal by comparing the count signal to a predetermined threshold.

24. The method of claim 23 where the film mode signal indicates the previous and future fields are from the same frame.

25. The method of claim 24 where selecting includes merging the current field with the previous field and choosing pixels in the merged field when the film mode detector generates the film mode signal.

26. The method of claim 24 where selecting includes merging the current field with the future field and choosing pixels in the merged field when the film mode detector generates the film mode signal.

27. The method of claim 21 comprising:
  generating a difference by subtracting the pixels in the sub image of the future field from corresponding pixels in the sub image of the previous field;
  generating a first compare signal by comparing the difference to a first threshold; and
  generating a second compare signal by comparing the difference to a second threshold.

28. The method of claim 27 where the difference is an absolute difference.

29. The method of claim 27 comprising:
  generating a first counter signal by counting first compare signals;
  generating a second counter signal by counting second compare signals;
  generating the motion signal by comparing the first counter signal to a third threshold; and
  generating the no motion signal by comparing the second counter signal to a fourth threshold.

30. The method of claim 21 where spatially interpolating pixels comprises:
  calculating a plurality of gradients corresponding to a plurality of directions;
  determining a minimum gradient direction from the plurality of gradients; and
  spatially interpolating a pixel responsive to the minimum gradient direction.

31. The method of claim 30 where spatially interpolating the pixel occurs responsive to predetermined formulas.

32. The method of claim 21 where spatial-temporally interpolating pixels comprises:
  calculating a plurality of gradients corresponding to a plurality of directions;
  determining a minimum gradient direction from the plurality of gradients; and
  spatial-temporally interpolating a pixel responsive to the minimum gradient direction.

33. The method of claim 32 where spatial-temporally interpolating the pixel occurs responsive to predetermined formulas.

* * * * *

UNITED STATES PATENT AND TRADEMARK OFFICE
CERTIFICATE OF CORRECTION

PATENT NO.          : 7,515,205 B1
APPLICATION NO. : 11/565524
DATED                   : April 7, 2009
INVENTOR(S)         : Wang et al.

Page 1 of 1

It is certified that error appears in the above-identified patent and that said Letters Patent is hereby corrected as shown below:

Column 7, lines 63-65, change

"$G_{a2} = w_{d2}[e_0|P26 - P42|+e_1 (|P25 - P41|+|P27|P43|) +_{e2}(|P08 - P24|+|P24 - P40|+||P28 - P44|+|P44 - P60|)]$"

to --$G_{a2} = w_{d2}[e_0|P26 - P42|+e_1 (|P25 - P41|+|P27 - P43|) +_{e2}(|P08 - P24|+|P24 - P40|+||P28 - P44|+|P44 - P60|)]$--

Column 8, line 32, change "gradient $G_{s2}$," to --gradient $G_{a2}$, --

Signed and Sealed this

Twenty-fifth Day of August, 2009

David J. Kappos
*Director of the United States Patent and Trademark Office*